(12) United States Patent
Chen et al.

(10) Patent No.: US 7,446,913 B2
(45) Date of Patent: Nov. 4, 2008

(54) IMAGE COMPENSATION STRUCTURE AND COMPENSATION METHOD

(75) Inventors: Chun-Jen Chen, Taichung Hsien (TW); Shang-Yu Yang, Kaohsiung (TW); Chun-I Hsiao, Hsinchu (TW); Tse-Hui Pang, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 1082 days.

(21) Appl. No.: 10/064,704

(22) Filed: Aug. 8, 2002

(65) Prior Publication Data
US 2004/0007669 A1 Jan. 15, 2004

(51) Int. Cl.
*H04N 1/46* (2006.01)
(52) U.S. Cl. ...................... 358/509; 358/512
(58) Field of Classification Search ............... 347/240; 250/208.1; 358/512, 516, 509, 475, 480, 358/471, 474, 510, 494, 496; 359/889
See application file for complete search history.

(56) References Cited

U.S. PATENT DOCUMENTS

| | | | | | |
|---|---|---|---|---|---|
| 5,245,179 | A | * | 9/1993 | Chang | 250/226 |
| 5,355,234 | A | * | 10/1994 | Kim | 358/512 |
| 5,812,176 | A | * | 9/1998 | Kawabe et al. | 347/240 |
| 5,818,033 | A | * | 10/1998 | Takeda et al. | 250/208.1 |
| 6,771,401 | B2 | * | 8/2004 | Chen | 358/512 |
| 7,006,163 | B2 | * | 2/2006 | Yamamoto et al. | 348/742 |

* cited by examiner

*Primary Examiner*—Jerome Grant, II
(74) *Attorney, Agent, or Firm*—Stolowitz Ford Cowger LLP

(57) ABSTRACT

An image compensation method is provided. At least one light source and a plurality of reflecting elements each capable of reflecting light from the light source are provided. Each reflecting element reflects a beam of light from the light source to produce a beam of reflected light having a unique color content. The reflecting elements are shifted to a location where one of the reflecting elements is capable of reflecting light from the light source.

53 Claims, 16 Drawing Sheets

IMAGE COMPENSATION STRUCTURE AND COMPENSATION METHOD

BACKGROUND OF INVENTION

1. Field of Invention

The present invention relates to an image compensation structure and compensation method. More particularly, the present invention relates to a method of using a reflective element to compensate for any variation in image quality on an optical sensor chip and a corresponding image compensation structure.

2. Description of Related Art

Following the rapid expansion of computer power, networking capability and multimedia development, not only can image patterns be directly captured by a digital camera, other related documents or pictures can also be captured through an optical scanner. The optical scanner converts textual or pictorial image in analogue format into digital output signals. Ultimately, a user may display, identify, edit or transfer the image file using a computer or some other electronic device.

In a scanning system, one major determinant of image quality is color temperature. The provision of an ideal color temperature enables an image sensor to operate within an optimal range so that the best pixel image quality is obtained. However, in actual manufacturing of the product, the elements may deviate from the standard design. In general, quality of the scan image may be improved and chromatic aberration of the scanned document may be reduced through adjusting the color temperature of a lamp tube. Since the response of an optical sensor chip with respect to the three primary colors (red, green and blue) are different, color temperature of the lamp tube must be adjusted to produce a balanced output. Currently, color temperature of a lamp tube is adjusted by changing the filler material inside the tube. This arrangement not only increases assembling cost, but is also demands lengthy lead time because at least two weeks are required to manufacture the lamp tube even if a suitable composition of the filler material is found.

SUMMARY OF INVENTION

Accordingly, one object of the present invention is to provide an image compensation method and an image compensation structure. Through a change in the design of reflective element, color of light projected from a light source is compensated so that color level and color of the light picked up by a document is changed. Ultimately, some manual labor and productive time is saved.

A second object of this invention is to provide an image compensation method and an image compensation structure adapted for reducing chromatic aberration of document images captured by a scanner.

To achieve these and other advantages and in accordance with the purpose of the invention, as embodied and broadly described herein, the invention provides an image compensation method. The method includes the following steps. In step one, at least one light source is provided. In step two, a plurality of reflecting elements is provided, each capable of reflecting light from a light source. Each reflecting element is designed to reflect a different color light. In step three, the reflecting element is moved such that one of the reflecting elements reflects light from the light source.

In one embodiment of this invention, a plurality of light sources is provided such that each reflecting element reflects only one of the light sources. When a reflecting element is moved, the corresponding light source also changes position. One light source emits light so that one of the reflecting elements reflects light from the light-emitting light source. In addition, as a light source illuminates one of the reflecting elements, the reflected light has a color composition that has a bias towards red, blue or green light. The light source can be a daylight lamp.

This invention also provides a second image compensation method. First, an optical sensor chip is used to find the respective response curves of the three primary colors of a light source so that the voltages of the three primary-colored lights within at least one particular area of the optical sensor chip is obtained. Thereafter, color of the compensation light is determined according to the response curves of the three primary-colored lights. Similarly, using the difference in voltage between the three primary-colored lights, strength of each compensation light is determined. A reflecting element is positioned in the vicinity of the light source. Color of light reflected from the reflecting element is identical to the required color of the compensation light and strength of the light reflected from the reflecting element is identical to the required strength of the compensation light.

This invention also provides a carrier having a groove and a reflecting element. The groove is on the carrier and the reflecting element is attached to the inner surface of the groove. Color of light reflected from the reflecting element is biased towards red, green or blue.

This invention also provides an image compensation structure inside a scanner. The image compensation structure includes a light source and a reflecting element. The reflecting element is capable of reflecting light emitted from the light source. The light reflected from the reflecting element has a color content that differs from the light emitted from the light source. Both the light emitted from the light source and the light reflected from the reflecting element are projected onto a scanning location. The light source, the reflecting element and the scanning location may form a triangular configuration. Alternatively, the reflecting element, the light source and the scanning location may form a linear configuration with the light source positioned between the reflecting element and the scanning location.

In the aforementioned method and structure, the reflecting element has a reflecting region. The width at each end of the reflecting region is greater than the width in the mid-section of the reflecting region. In addition, the reflecting element may have a multiple of sections such that the reflecting element is divided into a plurality of regions. Among these reflecting regions, at least one is a region for a single color, a region for a mix of two colors or a region for a mix of multiple colors. Furthermore, the entire reflecting element can be a region of a single color, a mix of two colors or a mix of multiple colors.

In brief, this invention utilizes a variation in the design of the reflecting element to compensate for the color projected from the light source so that the color level and color picked up by a scan document is modified. The image compensation method not only saves labor and time, but also reduces chromatic aberration in the scan document.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
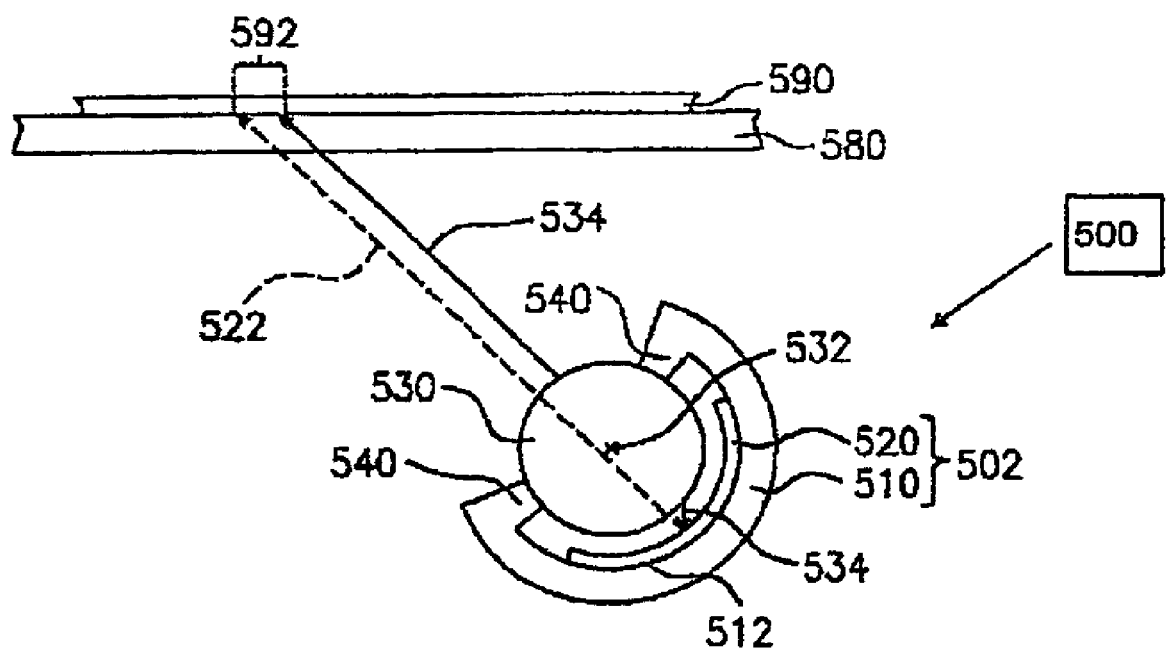
FIG. 1 is a cross-sectional view of an image compensation structure according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

This invention utilizes the special design of a reflecting element to change the color of white light impinging upon the element such that the reflected light biases towards a particular color. When the reflecting element absorbs more energy in the blue and green frequency spectrum, the reflected light will bias towards red. When the reflecting element absorbs more energy in the red and green frequency spectrum, the reflected light will bias towards blue. Similarly, when the reflecting element absorbs more energy in the red and blue frequency spectrum, the reflected light will bias towards green. Hence, using the difference in reflectivity of the reflection element relative to the three primary colors, the color of the reflected light may be adjusted so that an optical sensor will receive a balanced output of the three primary colors, red, green and blue. Ultimately, chromatic aberration of the output image from the scanner is greatly reduced.

The aforementioned goal is achieved through the structural design according to this invention. FIG. 1 is a cross-sectional view showing an Image compensation structure according to a first preferred embodiment of this invention. As shown in FIG. 1, the image compensation structure 500 includes a carrier 502 and a light source 530. The carrier 502 further includes a main body 510 and a reflecting element 520. The main body 510 has a longitudinal shape and includes a groove 512 and a plurality of bumps 540. The groove 512 has an arc-shaped sectional profile with a length roughly equal to the length of the main body 510. The reflecting element 520 is formed on the surface of the groove 512. The process of forming the reflecting element 520 includes sputtering or evaporation. The reflective element 520 may also be attached to the inner surface of the groove 512 when the reflective element 520 is fabricated into adhesive tape. The bumps 540 on each side of the main body 510 protrude beyond the opening of the groove 512. The bumps 540 extend in a direction parallel to the axial line 532 of the light source 530. Through the bumps 540 on the main body 510, the light source 530 is able to station within the groove 512. Light 534 from the light source 530 projects onto both the scanning location 592 and the reflecting element 520. The beam of light 522 reflected from the reflecting element 520 also travels to the scanning location 592. A document 590 on the top of a glass panel 580 corresponds in position to the scanning location 592. The image (not shown) thus generated is transferred to an optical sensor chip inside a scanning module (not shown). The optical sensor chip is a charge-coupled device (CCD), for example.

When the optical sensor chip has a lower response to red light, the reflecting element can be designed to have a stronger capacity for absorbing blue and green light and a lesser capacity for absorbing red light. Consequently, the reflecting element 520 may reflect more red light. Similarly, when the optical sensor chip has a lower response to blue light, the reflecting element can be designed to have a stronger capacity for absorbing red and green light and a lesser capacity for absorbing blue light. Hence, the reflecting element 520 may reflect back more blue light. Finally, when the optical sensor chip has a lower response to green light, the reflecting element can be designed to have a stronger capacity for absorbing blue and red light and a lesser capacity for absorbing green light. Therefore, the reflecting element 520 may reflect back more green light.

Furthermore, if the light source 530 has some design defects, the reflecting element 520 can be used to compensate for such defects. For example, if the light source 530 has a weaker emission in the red color range, the reflecting element 520 can be designed to have a higher capacity for absorbing blue and green light and a lower capacity for absorbing red light. Thus, the reflecting element 520 may reflect back more red light. Similarly, if the light source 530 has a weaker emission in the blue color range, the reflecting element 520 can be designed to have a higher capacity for absorbing red and green light and a lower capacity for absorbing blue light. Hence, the reflecting element 520 may reflect back more blue light. In the same way, if the light source 530 has a weaker emission in the green color range, the reflecting element 520 can be designed to have a higher capacity for absorbing red and blue light and a lower capacity for absorbing green light. Therefore, the reflecting element 520 may reflect back more green light.

In brief, color content of reflected light can be adjusted through the design of the reflecting element 520 so that overall response of the optical sensor chip to the three primary colors is more balanced and chromatic aberration of the scanned images is less severe.

Figure 2:
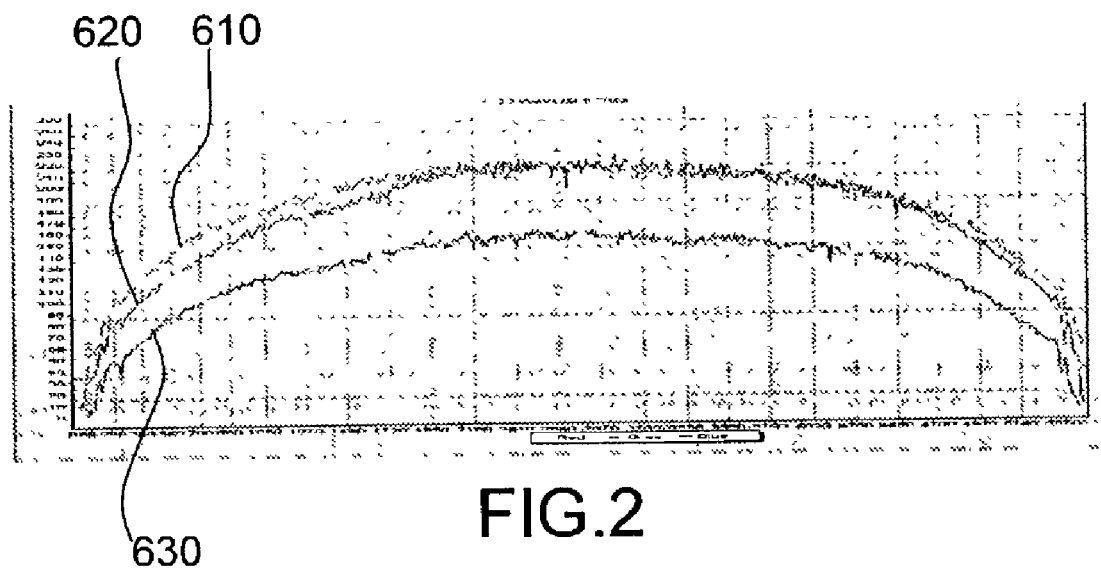
FIG. 2 is a graph showing the response curves of a light source (incorporating no reflecting element) captured through an optical sensor chip.

The following is an example illustrating the color compensation process. FIG. 2 is a graph showing the response curves of a light source (incorporating no reflecting element) captured through an optical sensor chip. In this embodiment, the light source emits white light. The horizontal axis indicates locations on the optical sensor chip illuminated by the light source and the vertical axis indicates the voltage levels that result from the respective strength of the three primary colors within the white light impinging at that location. Curve 610 is the response of red light, curve 620 is the response of green light and curve 630 is the response of blue light. As shown in FIG. 2, the voltage level of curve 630 is always lower than the voltage level of curve 610 and 620 everywhere on the optical sensor chip. In other words, the optical sensor chip has a weaker response to blue light. One can easily derive the differences in voltage levels between any two of the curves 610, 620 and 630 from FIG. 2. Once the differences in voltage levels are obtained, a corresponding table may be consulted to determine the degree of blue light compensation demanded from the reflecting element 520 inside the image compensation structure 500.

Figure 3:
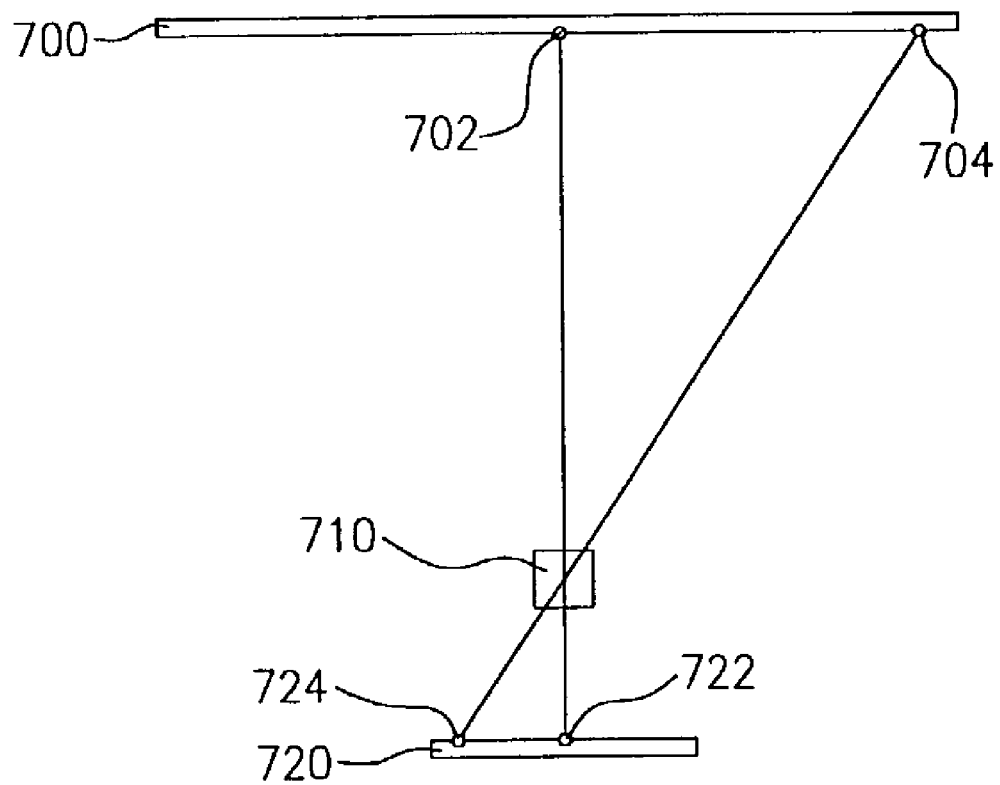
FIG. 3 is a schematic diagram showing the projection of a document image onto an optical sensor chip.

FIG. 3 is a schematic diagram showing the projection of a document image onto an optical sensor chip. In FIG. 3, the document is labeled 700, the lens is labeled 710 and the optical sensor chip is labeled 720. Assume the document 700 has two patterns 702 and 704 thereon set in such a way that the pattern 702 is close to the center while the pattern 704 is close to the edge. The pattern 702 will project to a location 722 on the optical sensor chip 720 and the pattern 704 will project onto another location 724 on the optical sensor chip 720. In other words, the distance from the pattern point 704 to the image point 724 is longer than the distance from the pattern point 702 to the image point 722. Thus, corresponding to the pattern point 704 illuminated by a light source, the reflecting element needs to have a larger reflecting region to provide more compensation for the light of a particular color.

Figure 4:
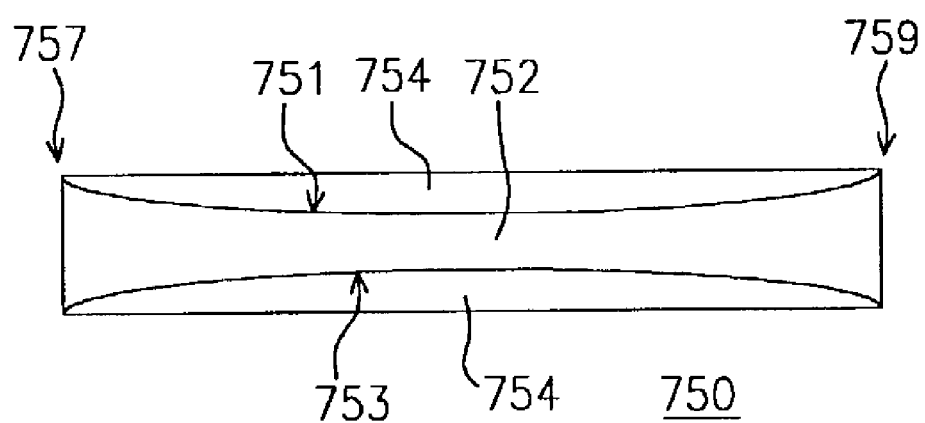
FIG. 4 is a front view of a reflecting element according to one preferred embodiment of this invention.
Figure 5:
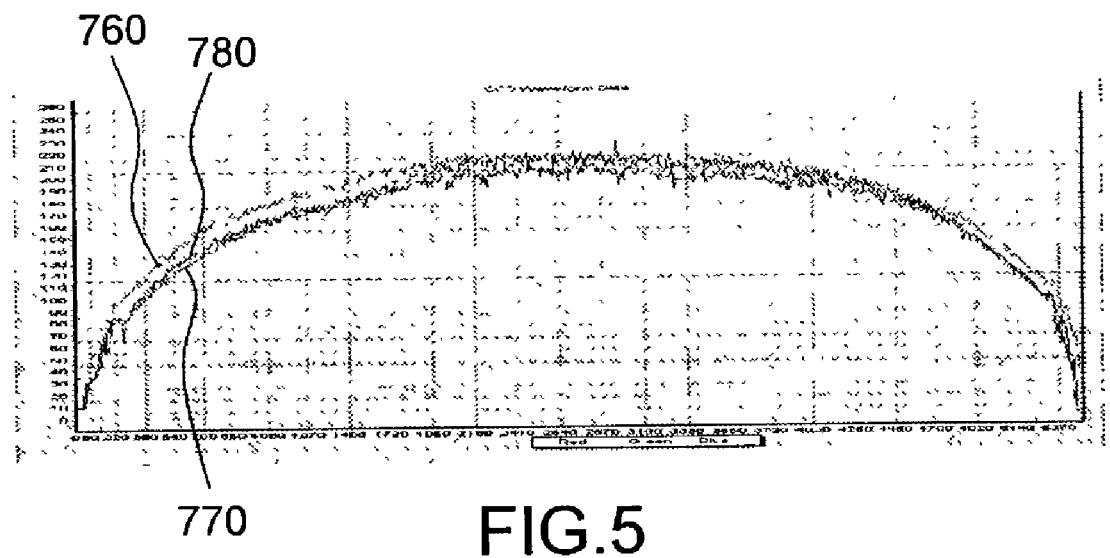
FIG. 5 is a graph showing the response curves of a light source (incorporating a reflecting element) captured through an optical sensor chip as shown in FIG. 4.

Due to the aforementioned consideration, a reflecting element having a configuration shown in FIG. 4 is produced. FIG. 4 is a front view of a reflecting element according to one preferred embodiment of this invention. The reflecting element 750 has a longitudinal profile divided into a reflecting region 752 and a non-reflecting region 754. The non-reflecting region 754 is located outside the two inward-curving side edges 751, 753 of the reflecting region 752. The width of the reflecting region 752 close to the ends 757, 759 is larger than the width of the reflecting region 752 close to the central portion. Moreover, the two inward-curving side edges 751, 753 of the reflecting element 750 are smooth and continuous. The non-reflecting region 754 is painted black and the reflecting region 752 is painted a color that increases the reflectivity of red light, for example. However, a color capable of increasing the reflectivity of green or blue light may also be painted over the reflecting region 752. Under the circumstances depicted in FIG. 2, the reflecting region 752 should be designed to enhance the reflectivity of the blue light and the reflecting region 752 near the ends 757, 759 should be designed with a greater width. Hence, the end sections of the light source can provide more compensation for blue light. FIG. 5 is a graph showing the response curves of a light source (incorporating a reflecting element) captured through an optical sensor chip as shown in FIG. 4. In FIG. 5, the horizontal axis indicates locations on the optical sensor chip illuminated by the light source and the vertical axis indicates the voltage levels that result from the respective strength of the three primary colors within the white light impinging at that location. Curve 760 is the response of red light, curve 770 is the response of green light and curve 780 is the response of blue light. As shown in FIG. 5, the voltages of curves 760, 770, 780 are almost the same and always within an acceptable range whatever the location on the optical sensor chip. In other words, response of the optical sensor chip to red, green and blue light is almost identical. Hence, the weaker response of the optical sensor chip to blue light is compensated.

Figure 6:
FIG. 6 is a front view of a reflecting element according to another preferred embodiment of this invention.
Figure 7:
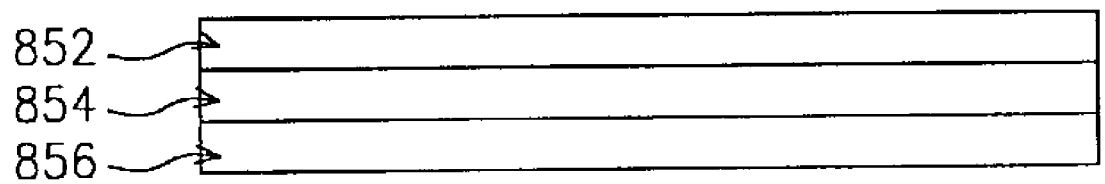
FIG. 7 is a front view of a reflecting element according to yet another preferred embodiment of this invention.

In addition, the reflecting element is not limited to the aforementioned design. Other designs such as the ones shown in FIGS. 6 and 7 are also possible. FIG. 6 is a front view of a reflecting element according to another preferred embodiment of this invention. FIG. 7 is a front view of a reflecting element according to yet another preferred embodiment of this invention. In FIG. 6 the entire surface of the reflecting element 800 forms a single color system capable of reflecting light. The reflecting element 800 may reflect light of a single color, a mix of two colors or a mix of multiple colors. In FIG. 7, the reflecting element 850 is divided into a number of sections such as three sections 852, 854 and 856. Each of the sections 852, 854, 856 may reflect light of a single color, a mix of two colors or a mix of multiple colors. Through the reflecting elements 800 and 850 in FIGS. 6 and 7, light of a particular color can be compensated.

Figure 8:
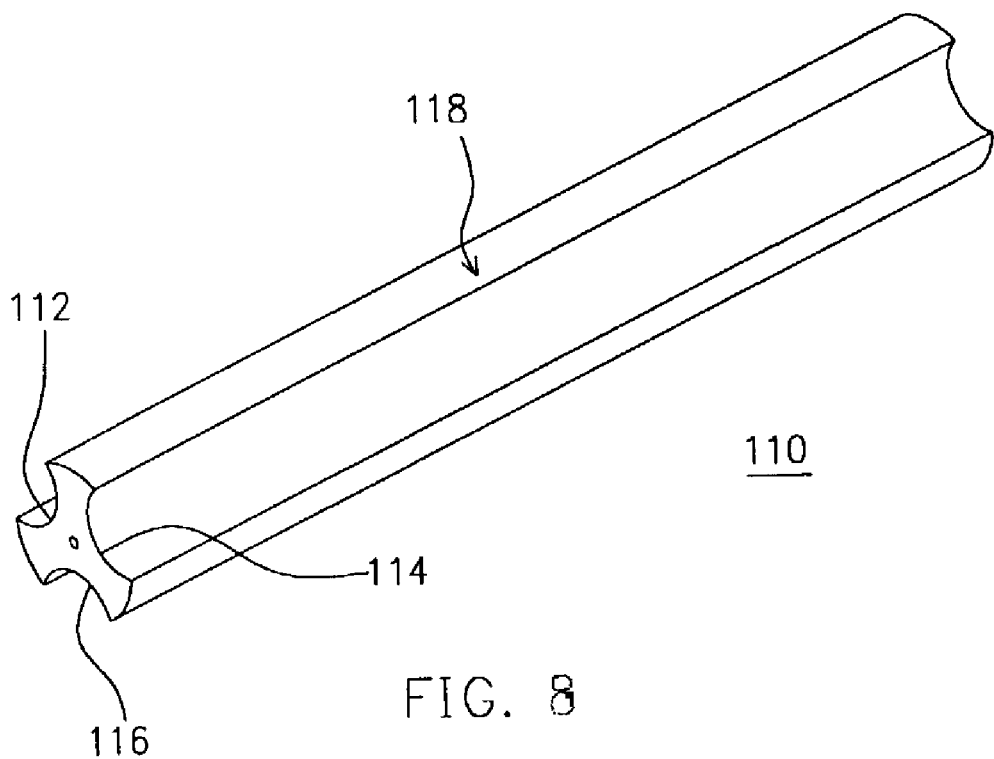
FIG. 8 is a perspective view of the main body of a carrier according to one preferred embodiment of this invention.

In the aforementioned embodiment, a single reflecting element is used. However, a multiple of reflecting elements may be incorporated and attached to a carrier. FIG. 8 is a perspective view of the main body of a carrier according to one preferred embodiment of this invention. As shown in FIG. 8, the carrier has a main body 110 with a longitudinal profile. The main body 110 has a plurality of grooves such as three grooves respectively defined as the first groove 112, the second groove 114 and the third groove 116. The grooves 112, 114 and 116 are formed on the surface 118 of the main body 110. All the grooves have an arc-shape sectional profile with the length of each groove roughly identical to the length of the main body 110. In general, the main body 110 or the grooves 112, 114, 116 can be modified to fit actual demands. Moreover, the number of grooves is not limited to three but any other number.

Figure 9:
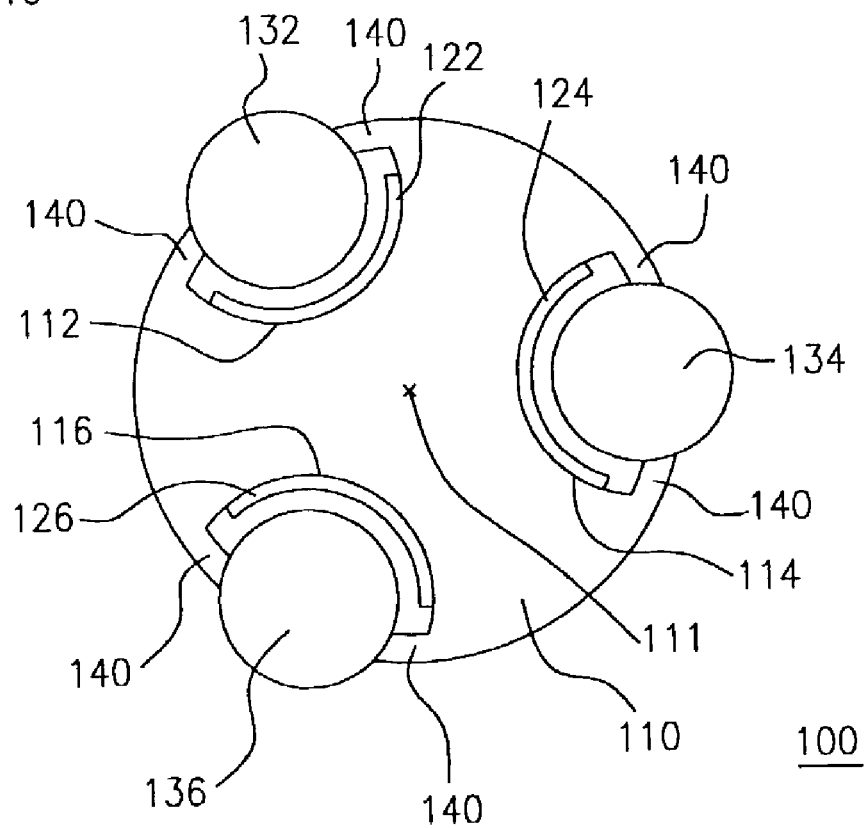
FIG. 9 is a schematic cross-sectional view of an image compensation structure according to one preferred embodiment of this invention.

FIG. 9 is a schematic cross-sectional view of an image compensation structure according to one preferred embodiment of this invention. The image compensation structure 100 includes a carrier and a plurality of light sources such as the three defined as the first light source 132, the second light source 134 and the third light source 136. The light sources 132, 134, 136 are daylight lamps capable of emitting white light, for example. The carrier further includes a plurality of reflecting elements such as the three reflecting elements defined as the first reflecting element 122, the second reflecting element 124 and the third reflecting element 126 respectively. The reflecting elements 122, 124, 126 can be reflecting panels, for example. The first reflecting element 122 is attached to the surface of the first groove 112. Similarly, the second reflecting element 124 is attached to the surface of the second groove 114 and the third reflecting element 126 is attached to the surface of the third groove 116. The main body 110 further includes a plurality of bumps 140 on each side edge of the first groove 112, the second groove 114 and the third groove 116 respectively. The bumps 140 extend in a direction parallel to the axial line 111 of the main body 110. Hence, the bumps 140 are capable of clamping the first light source 132, the second light source 134 and the third light source 136 respectively. Hence, the first light source 132 is fixed inside the first groove 112, the second light source 134 is fixed inside the second groove 114 and the third light source 136 is fixed inside the third groove 116. The reflecting elements 122, 124 and 126 reflect light from the respective light sources 132, 134 and 136 and the reflected light from each reflecting element has a different color level or color. For example, the first light source 132 illuminates the first reflecting element 122 to produce reflected light biased towards the color red. Similarly, the second light source 134 illuminates the second reflecting element 124 to produce reflected light biased towards the color blue and the third light source 136 illuminates the third reflecting element 126 to produce reflected light biased towards the color green. Furthermore, the main body 110 may rotate around the axis 111 so that both the light sources 132, 134, 136 and the reflecting elements 122, 124, 126 rotate synchronously.

In the following, a method of operating the aforementioned image compensation structure is described. Assume the optical sensor chip (not shown) has a weak response towards red light. To compensate for this weakness, the main body 110 rotates so that the first light source 132 is turned to an illumination position and powered up. Hence, the first reflecting element 122 is able to reflect light biased towards red color and balance the response of the optical sensor chip towards the three primary colors (red, green and blue). When the first light source 132 is powered up, the second light source 134 and the third light source 136 are both shut off to produce a dark state. Similarly, assume the optical sensor chip (not shown) has a weak response towards blue light. To compensate for this weakness, the main body 110 rotates so that the second light source 134 is turned to an illumination position and powered up. Hence, the second reflecting element 124 is able to reflect light biased towards blue color and balance the response of the optical sensor chip towards the three primary colors (red, green and blue). When the second light source 134 is powered up, the first light source 132 and the third light source 136 are both shut off to produce a dark state. Again, assume the optical sensor chip (not shown) has a weak response towards green light. To compensate for this weakness, the main body 110 rotates so that the third light source 136 is turned to an illumination position and powered up. Hence, the third reflecting element 126 is able to reflect light biased towards green color and balance the response of the optical sensor chip towards the three primary colors (red, green and blue). When the third light source 136 is powered up, the first light source 132 and the second light source 134 are both shut off to produce a dark state.

The aforementioned image compensation structure and the image compensation method is able to compensate the color of light emitted from the light sources 132, 134, 136 through a change in the design of the reflecting elements 122, 124 and 126. Ultimately, color level and color of light picked up by a scan document is modified. The image compensation method not only saves labor and time, but also reduces chromatic aberration of image captured by a scanner.

Figure 10:
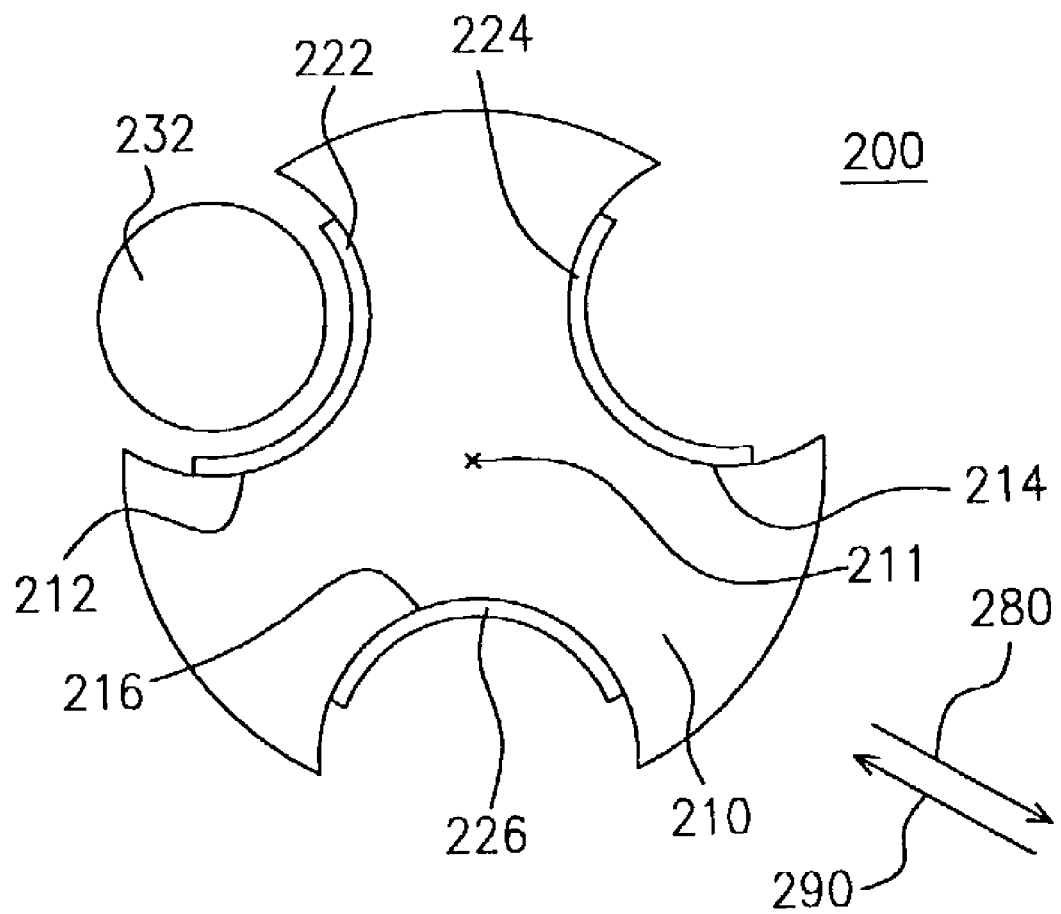
FIGS. 10 to 13 are cross-sectional views showing an image compensation structure and the process of effecting color compensation according to another preferred embodiment of this invention.

In addition, other applications of the invention are possible. FIGS. 10 to 13 are cross-sectional views showing an image compensation structure and the process of effecting color compensation according to another preferred embodiment of this invention. First, as shown in FIG. 10, an image compensation structure 200 having a carrier and a light source 232 is provided. The light source 232 is capable of emitting uniform white light. The carrier further includes a main body 210, a plurality of grooves 212, 214, 216 and a plurality of reflecting elements 222, 224, 226. The grooves 212, 214, 216 are defined as the first groove 212, the second groove 214 and the third groove 216 respectively. The reflecting elements 222, 224, 226 are defined as the first reflecting element 222, the second reflecting element 224 and the third reflecting element 226 respectively. The grooves 212, 214, 216 are formed on the surface of the main body 210. Each of the grooves 212, 214, 216 is capable of accommodating a lamp tube 232. The first reflecting element 222, the second reflecting element 224 and the third reflecting element 226 are attached to the surfaces of the main body 210 inside the first groove 212, the second groove 214 and the third groove 216 respectively. Each of the reflecting elements 222, 224, 226 receives light emitted from the lamp tube 232 and reflects back a beam of light having a different color level or color. For example, the reflected light from the first reflecting element 222 after illumination by the lamp tube 232 is biased towards the color red. Similarly, the reflected light from the second reflecting element 224 after illumination by the lamp tube 232 is biased towards the color blue and the reflected light from the third reflecting element 226 after illumination by the lamp tube 232 is biased towards the color green. Furthermore, the main body 210 may shift in and out following the arrow-labeled directions 280, 290 and rotate around the central axis 211 of the main body 211.

Figure 11:
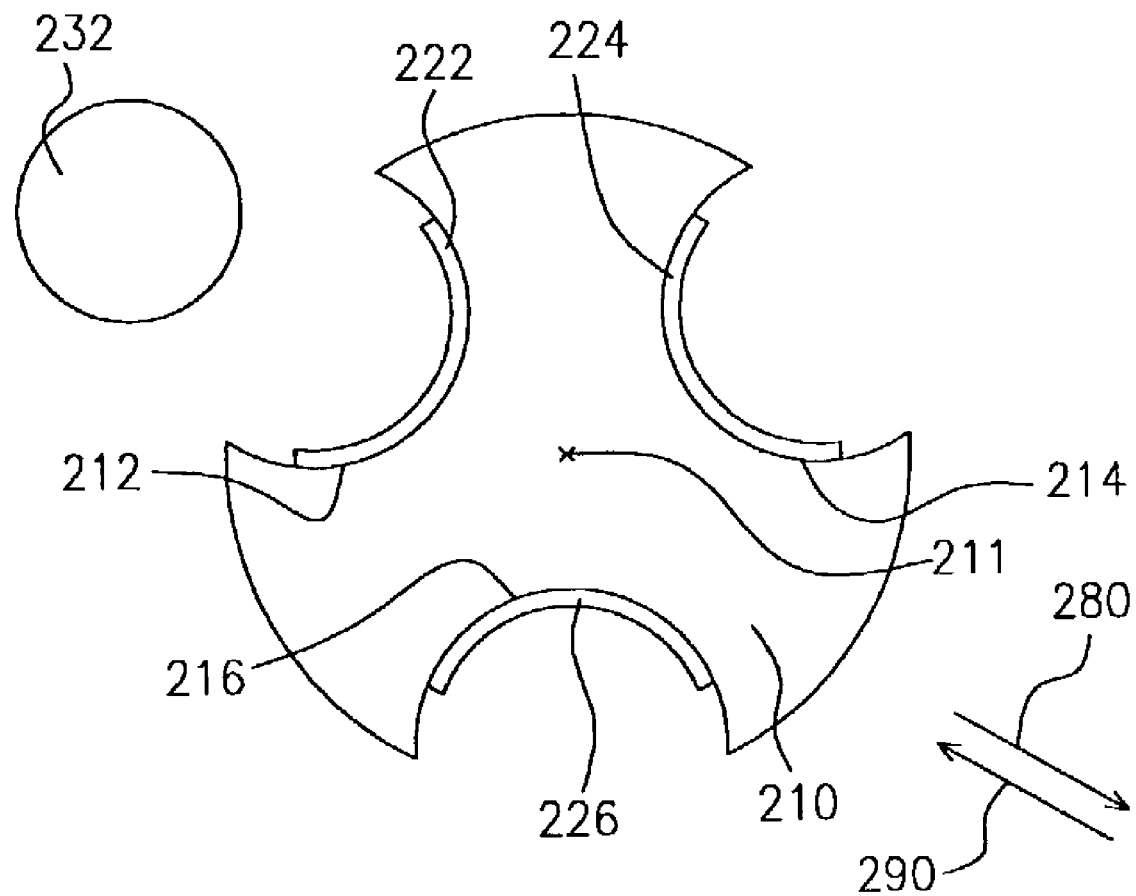
Figure 12:
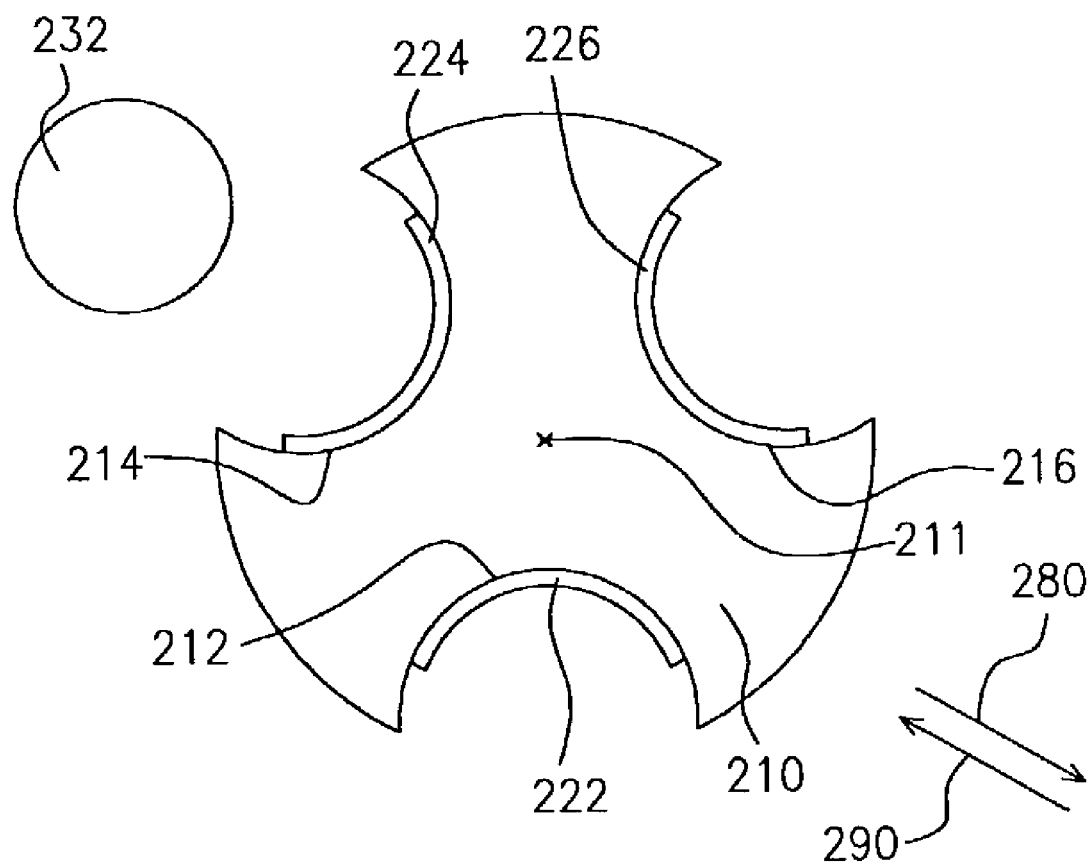
Figure 13:
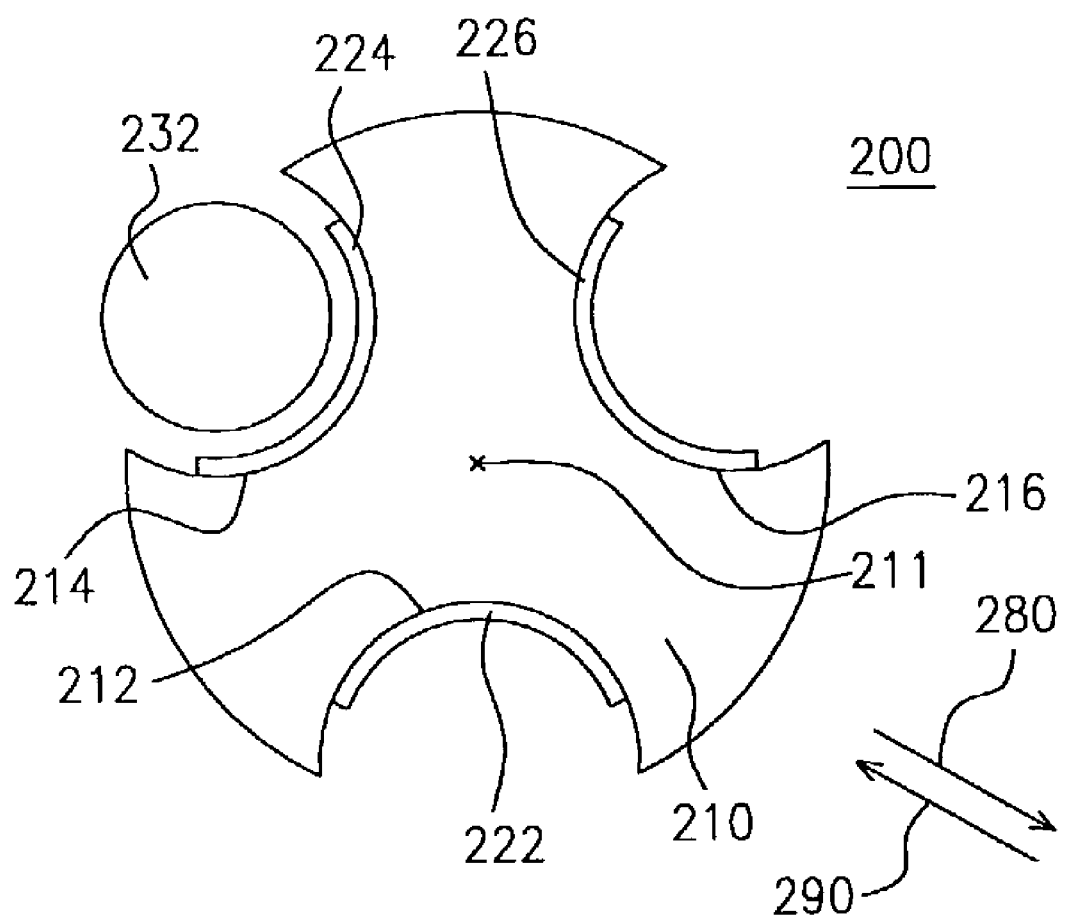

The following describes a method of using the image compensation structure. Assume an optical sensor (not shown) has a weaker response to red light. To compensate for the weaker response of red light, the main body 210 shifts and rotates so that the light source 232 moves into the first groove 212. The light source 232 is powered up to illuminate the first reflecting element 222 so that the first reflecting element 222 is able to reflect light biased towards red color and balance the response of the optical sensor chip towards red, green and blue light. Similarly, assume the optical sensor (not shown) has a weaker response to blue light. To compensate for the weaker response of blue light, the main body 210 moves forward in the arrow-labeled direction 280 so that the lamp tube 232 moves away from the first groove 212 as shown in FIG. 11. Thereafter, the main body 210 rotates centered upon the central axis 211 of the main body 210 so that the opening of the second groove 214 is below the lamp tube 232 as shown in FIG. 12. Finally, the main body moves in the arrow-labeled direction 290 so that the lamp tube 232 moves into the second groove 214 as shown in FIG. 13. The lamp tube 232 is powered up to illuminate the second reflecting element 224 so that the second reflecting element 224 is able to reflect light biased towards blue color and balance the response of the optical sensor chip towards red, green and blue light. Again, assume the optical sensor (not shown) has a weaker response to green light. To compensate for the weaker response to green light, the main body 210 is moved and rotated following the aforementioned steps so that the lamp tube 232 is housed inside the third groove 216. The light source 232 is powered up to illuminate the third reflecting element 226 so that the third reflecting element 226 is able to reflect light biased towards green color and balance the response of the optical sensor chip towards red, green and blue light.

In the aforementioned embodiment, the light source remains stationary while the main body shifts and rotates to adjust the position of the reflecting elements relative to the lamp tube so that light having different color level or color is reflected back through various reflecting elements. However, adjustment between the lamp tube and the main body is not limited to the aforesaid because other types of movements are also possible. FIGS. 14 to 17 are cross-sectional views showing an image compensation structure and the process of effecting color compensation according to yet another preferred embodiment of this invention. Since both the carrier and lamp tube have a similar structure, detailed description of them is omitted. Each of the reflecting elements 322, 324, 326 reflects light having a different color level or color from the lamp tube 332. For example, the reflected light from the first reflecting element 322 after illumination by the lamp tube 332 is biased towards the color red. Similarly, the reflected light from the second reflecting element 324 after illumination by the lamp tube 332 is biased towards the color blue and the reflected light from the third reflecting element 326 after illumination by the lamp tube 332 is biased towards the color green.

Figure 14:
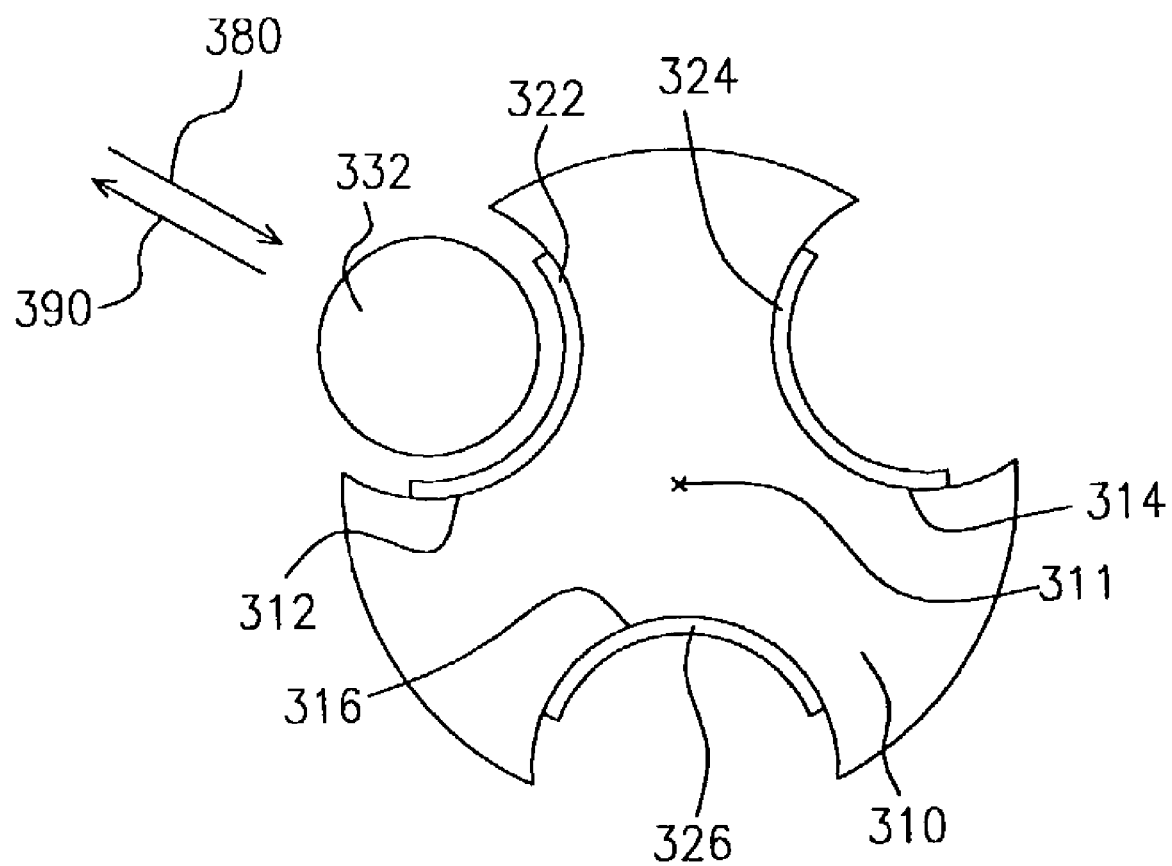
FIGS. 14 to 17 are cross-sectional views showing an image compensation structure and the process of effecting color compensation according to yet another preferred embodiment of this invention.
Figure 15:
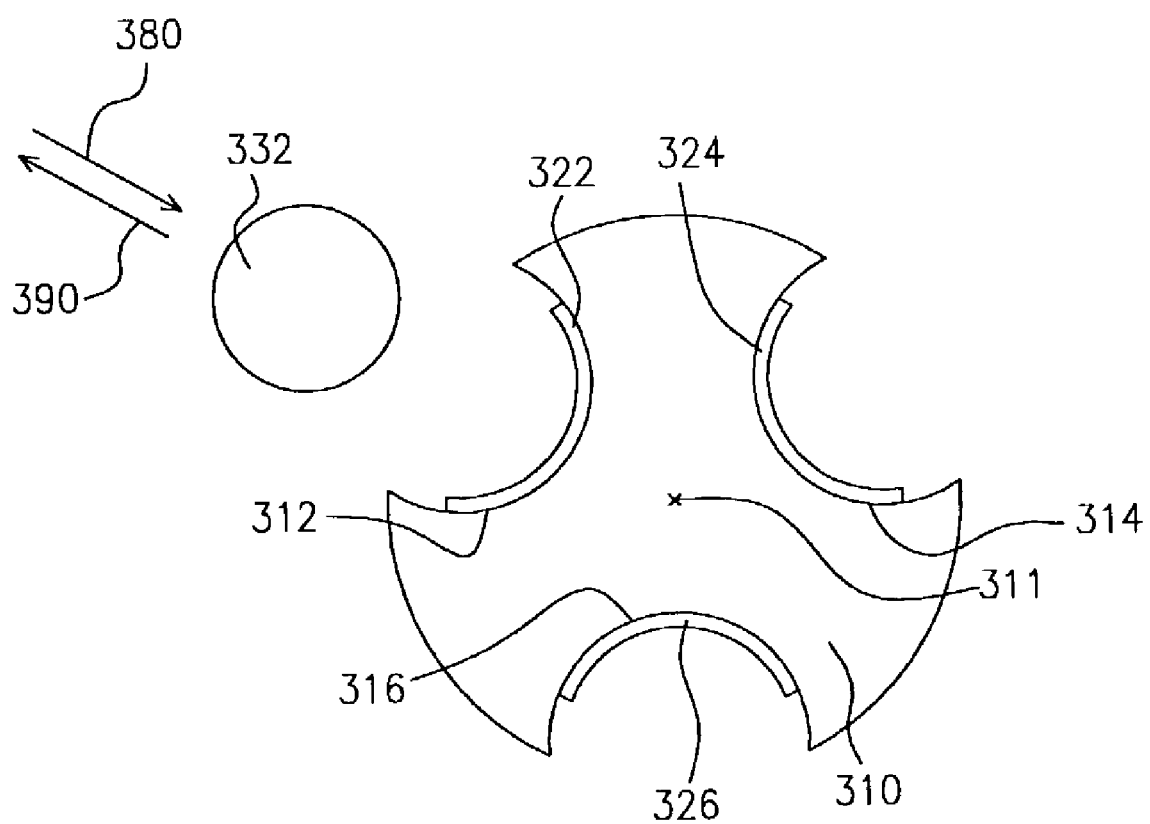
Figure 16:
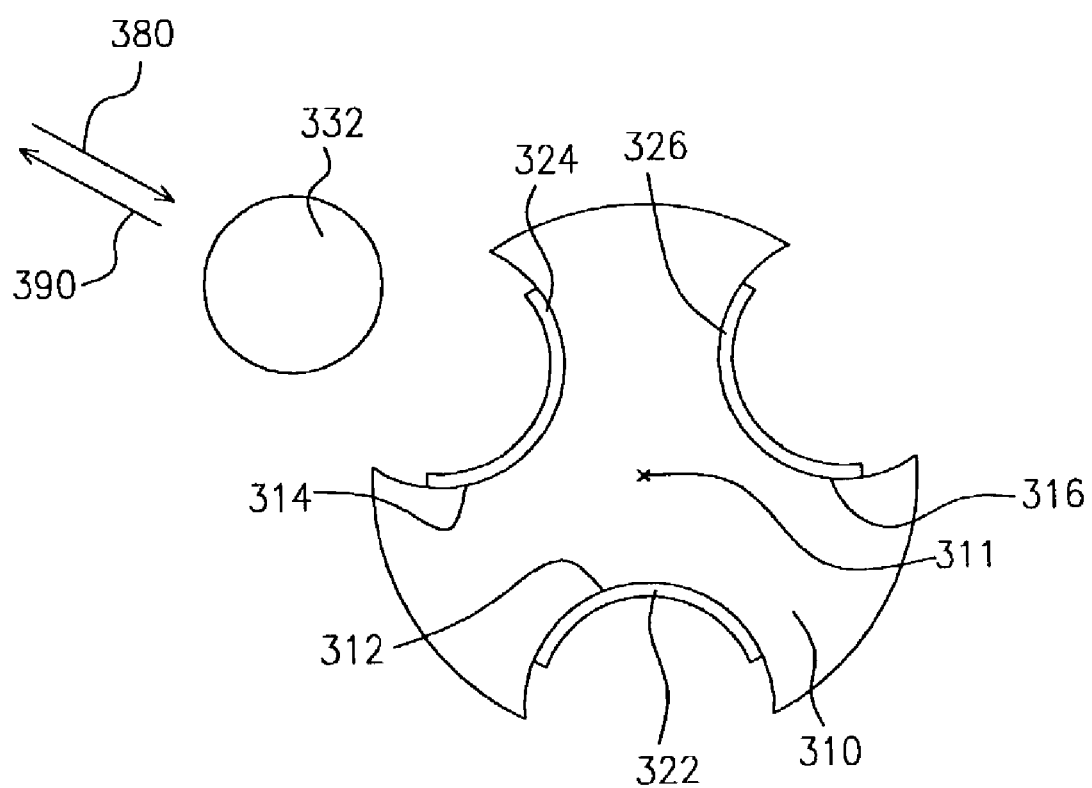
Figure 17:
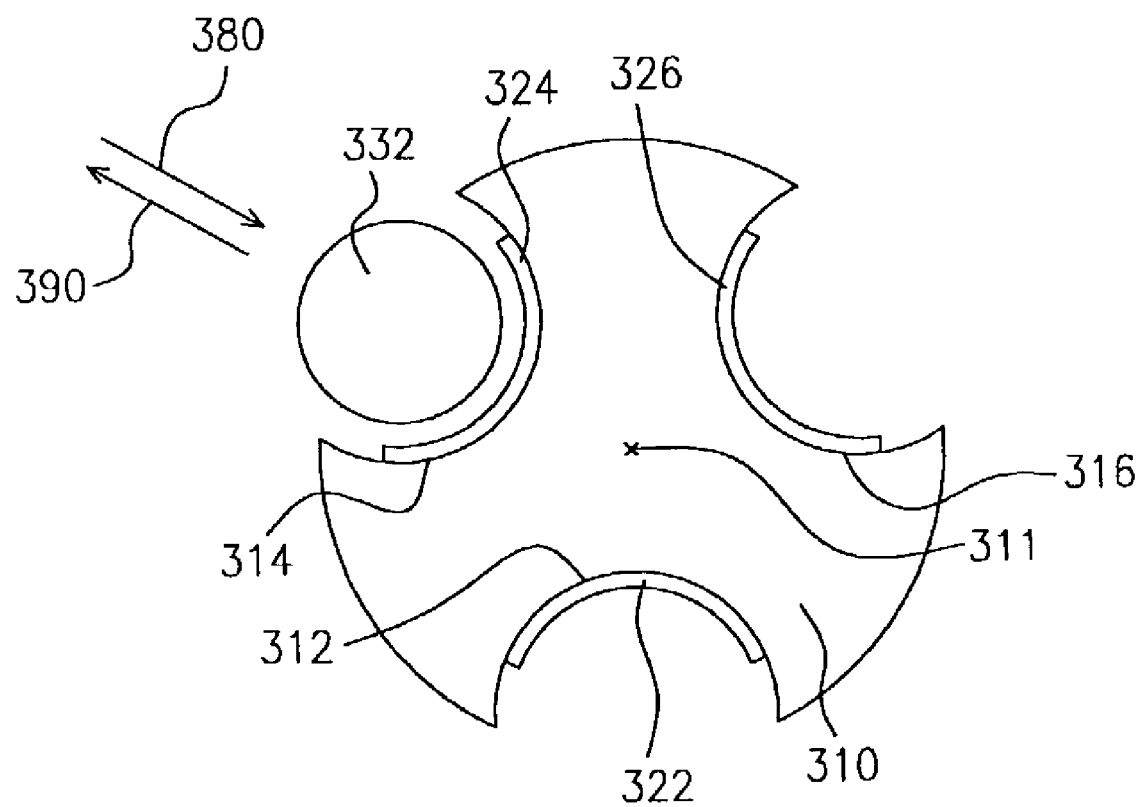

As shown in FIG. 14, assume an optical sensor (not shown) has a weaker response to red light. To compensate for the weaker response in red light, the light source 332 is shifted and the main body 310 is rotated so that the lamp tube 332 moves into the first groove 312 of the main body 310. The lamp tube 332 is powered up to illuminate the first reflecting element 322 so that the first reflecting element 322 is able to reflect light biased towards red color and balance the response of the optical sensor chip towards red, green and blue light. Similarly, assume the optical sensor (not shown) has a weaker response to blue light. To compensate for the weaker response to blue light, the lamp tube 332 moves in the arrow-labeled direction 390 so that the lamp tube 332 moves away from the first groove 312 as shown in FIG. 15. Thereafter, the main body 310 rotates around the central axis 311 of the main body 310 so that the opening of the second groove 314 is below the lamp tube 332 as shown in FIG. 16. Finally, the lamp tube 332 moves in the arrow-labeled direction 380 so that the light source 332 moves into the second groove 314 as shown in FIG. 17. The lamp tube 332 is powered up to illuminate the second reflecting element 324 so that the second reflecting element 324 is able to reflect light biased towards blue color and balance the response of the optical sensor chip towards red, green and blue light. Again, assume the optical sensor (not shown) has a weaker response to green light. To compensate for the weaker response of green light, the lamp tube 332 is shifted and the main body 310 is rotated following the aforementioned steps so that the lamp tube 332 is housed inside the third groove 316. The light source 332 is powered up to illuminate the third reflecting element 326 so that the third reflecting element 326 is able to reflect light biased towards green color and balance the response of the optical sensor chip towards red, green and blue light.

Figure 18:
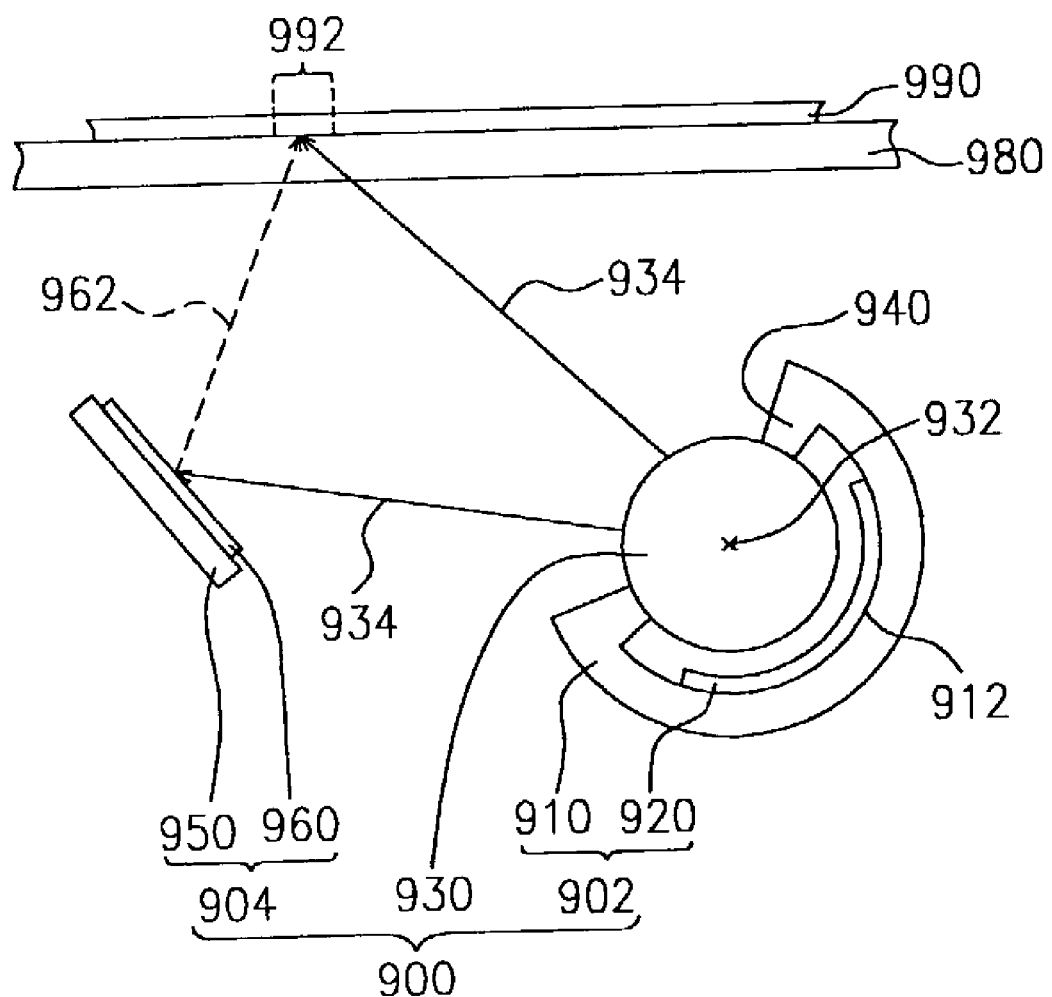
FIG. 18 is a side view of an image compensation system according one preferred embodiment of this invention.

In the aforementioned embodiments, the scanning position, the light source and the reflecting elements are located along a straight line with the light source positioned between the scanning position of the document and the reflecting element. However, this invention also permits other configurations for compensating the response of the optical sensor chip towards the light from the light source. FIG. 18 is a side view of an image compensation system according one preferred embodiment of this invention. As shown in FIG. 18, the image compensation structure 900 includes a carrier 902, a light compensator 904 and a light source 930. The carrier 902 has a main body 910 and a reflecting element 920. The main body 910 has a longitudinal profile with a groove 912 and a plurality of bumps 940. The groove 912 has an arc-shape sectional profile. The groove 912 has a length roughly equal to the length of the main body 910. The reflecting element 920 is attached to the surface of the groove 912. The reflecting element 920 is formed on the surface of the groove 912 by sputtering or evaporation, for example. Alternatively, the reflecting element 920 can be fabricated into a sheet of adhesive tape for easy attachment to the surface of the groove 912. In addition, the bumps 940 on each side of the main body 910 protrude beyond the opening of the groove 912. The bumps 940 extend in a direction parallel to the axial line 932 of the light source 930. Through the bumps 940 on the main body 910, the light source 930 is able to station within the groove 912. The light compensator 904 is positioned in a region close to the opening of the groove 912. The light compensator 904 has a supporting frame 950 and a reflecting element 960 with the reflecting element 960 resting on the supporting frame 950. The reflecting element 960 is formed on the supporting frame 950 by sputtering or evaporation, for example. Alternatively, the reflecting element 960 can be fabricated into a sheet of adhesive tape for easy attachment to the surface of supporting frame 950. When the light source 930 emits light 934, some of the light 934 projects onto the reflecting element 960 to form a beam of reflected light 962 (dash line in the figure). The beam of reflected light 962 projects onto the document 990 lying above a glass panel 980. Consequently, illumination level of the document 990 is increased. Thus, color of the light 934 projected from the light source 930 is compensated. In this embodiment, the scanning position 992, the light source 930 and the reflecting element 960 form a triangular configuration.

In actual applications, the following three situations are often encountered. In the first situation, the reflecting element 920 is painted pure white for increasing the brightness level of the illuminated document 990. The reflecting element 960 can be designed to reflect light having a bias towards the color red, green or blue. Hence, aside from increasing the brightness level of the illuminated document 990, colors of the light beam 934 projected from the light source 930 are compensated. In the second situation, the reflecting element 960 is painted pure white for increasing the brightness level of the illuminated document 990. Meanwhile, the reflecting element 920 can be designed to reflect light having a bias towards the color red, green or blue. Thus, aside from increasing the brightness level of the illuminated document 990, colors of the light beam 934 projected from the light source 930 are compensated. In the third situation, both reflecting elements 920 and 960 are designed to reflect light having a bias towards the color red, green or blue. Therefore, aside from increasing the brightness level of the illuminated document 990, colors of the light beam 934 projected from the light source 930 are compensated.

In addition, the reflecting elements 920 and 960 can have a structure similar to the ones shown in FIGS. 4, 6 and 7. Since these structures have been described before, details are not repeated here.

Figure 19:
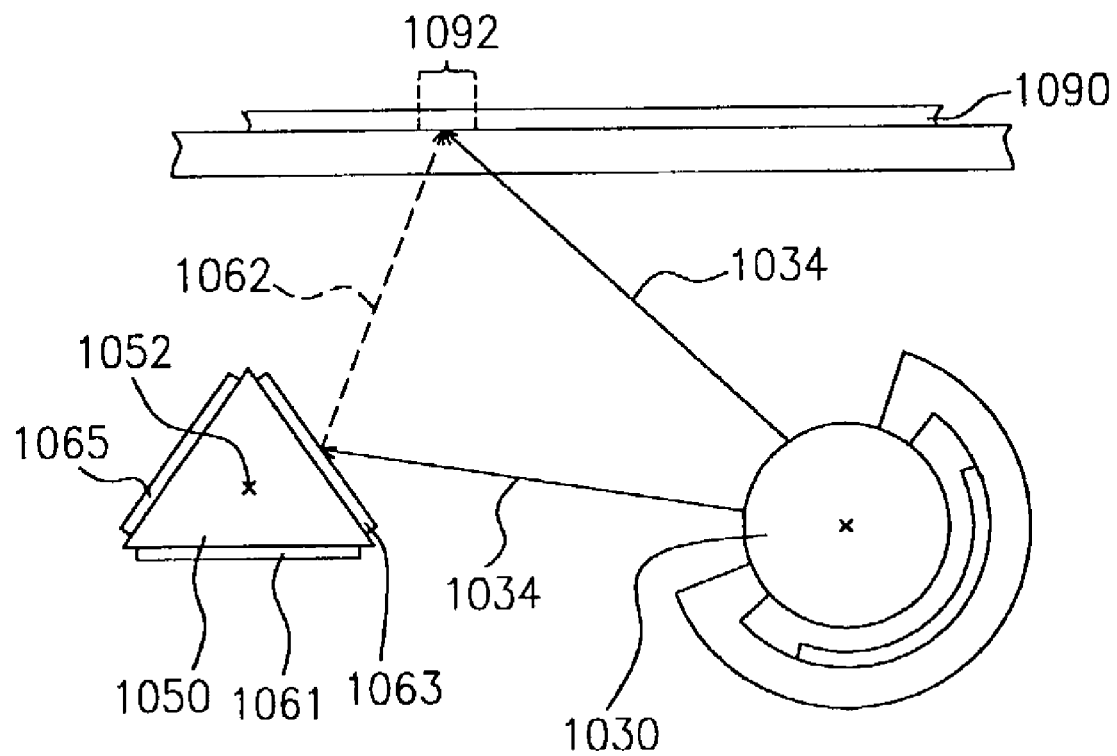
FIG. 19 is a side view of an image compensation system according another preferred embodiment of this invention.

FIG. 19 is a side view of an image compensation system according another preferred embodiment of this invention. In FIG. 19, the scanning position 1092, the light source 1030 and the supporting frame 1050 form a triangular configuration. The supporting frame 1050 has a number of reflecting elements such as three reflecting elements defined as the first reflecting element 1061, the second reflecting element 1063 and the third reflecting element 1065 respectively. The reflecting elements 1061, 1063, and 1065 are attached to the three surfaces of the supporting frame. In this embodiment, the supporting frame 1050 is shaped into a triangular column having an axial line 1052 passing through the center to serve as a center of rotation. Each reflecting element 1061, 1063 or 1065 reflects a different color level or color for light beams 1034 coming from the light source 1030. For example, the light source 1030 illuminates the first reflecting element 1061 to produce reflected light (not shown) biased towards the color red. Similarly, the light source 1050 illuminates the second reflecting element 1063 to produce reflected light biased towards the color blue and the light source 1030 illuminates the third reflecting element 1065 to produce reflected light (not shown) biased towards the color green.

In actual applications, the supporting frame 1050 may be rotated to adjust the strength of reflected light projected from the reflecting elements 1061, 1063, 1065 onto the scanning position 1092 so that the degree of compensation for the light beam 1034 from the light source 1030 is controlled. Hence, response of the optical sensor chip towards the three primary colors is more balanced. For example, if the optical sensor chip has a weaker response to blue light, the supporting frame 1050 may be rotated to a position that permits light 1034 from the light source 1030 to impinge upon the second reflecting element 1063. In this way, reflected light 1062 from the second reflecting element 1063 is projected onto the scanning position 1092. If blue light is somehow over-compensated, the supporting frame 1050 may rotate slightly so that the second reflecting element 1063 moves slightly away from the scanning position 1092. An alternative way of reducing blue light compensation is to tilt the second reflecting element 1063 more negatively away from the scanning position 1092. On the other hand, if the blue is somehow under-compensated, the supporting frame 1050 may rotate slightly so that the second reflecting element 1063 moves slightly towards the scanning position 1092. An alternative way of increasing blue light compensation is to tilt the second reflecting element 1063 more positively facing the scanning position 1092.

In conclusion, the image compensation method and the image compensation structure according to this invention has the following advantages:

1. Through a change in the design of reflecting elements, color of the light beam projected from a light source can be compensated and hence color level or color picked up by a scan object can be modified. Moreover, the image compensation method demands little additional labor and assembling time.

2. Chromatic aberration of document image captured by the scanner is greatly reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An image compensation method, comprising:
   providing a light source to produce light having a first color content;
   providing a carrier having a plurality of grooves formed thereon and a plurality of reflecting elements disposed thereon, wherein the grooves are formed on the surface of the carrier and the reflecting elements are disposed on surfaces of the carrier inside the grooves, wherein the light source is disposed in a first one of the grooves, and each reflecting element is arranged, if aligned with the light source, to reflect at least a portion of the produced light from the light source to produce a beam of light biased towards a second color content different from the first color content, wherein reflecting elements are arranged to direct the reflected beam of light to a scanning location;
   moving either the carrier or the light source so that the light source is displaced from the groove;
   rotating the carrier so that a second different one of the grooves aligns with the light source; and
   moving either the carrier or the light source so that the light source is disposed in the second groove.

2. The method of claim 1, wherein light reflected from at least one of the reflecting elements is biased towards red.

3. The method of claim 1, wherein light reflected from at least one of the reflecting elements is biased towards blue.

4. The method of claim 1, wherein the carrier is rotated within an imaging device.

5. The method of claim 1, wherein the light source comprises a daylight lamp.

6. The method of claim 1, wherein at least one of the reflecting elements includes a reflecting region having a width at both ends that is greater than a width in a middle of the reflecting region.

7. The method of claim 1, wherein at least one of the reflecting elements includes multiple sections.

8. The method of claim 1, wherein at least one of the reflecting elements is partitioned into a plurality of regions and at least one of the regions is configured to reflect light having a different color bias than light reflected from another region.

9. The method of claim 1, wherein at least one of the reflecting elements is configured to reflect light having a color content biased toward a single color, or a mix of two or more colors.

10. An image compensation method for illuminating a document comprising:
    providing a plurality of light sources;
    providing a carrier having a plurality of grooves formed thereon and a plurality of reflecting elements disposed thereon, wherein the grooves are formed on the surface of the carrier and the reflecting elements are disposed on the surface of the carrier inside the grooves, wherein the light sources are disposed inside the grooves, wherein each reflecting element is operable to reflect light from a corresponding one of the light sources to produce a reflected light having a different color content than light from the corresponding light source; and
    wherein the reflecting elements are positioned to reflect light to the document.

11. The method of claim 10, further comprising rotating the carrier inside a scanner.

12. The method of claim 10, wherein the color content of light reflected from at least one of the reflecting elements is biased towards blue.

13. The method of claim 10, wherein the color content of light reflected from at least one of the reflecting elements is biased towards green.

14. The method of claim 10, wherein the light source comprises a daylight lamp.

15. The method of claim 10, wherein at least one of the reflecting elements includes a reflecting region having a width at both ends that is greater than a width in a middle of the reflecting region.

16. The method of claim 10, wherein at least one of the reflecting elements includes multiple sections.

17. The method of claim 10, wherein at least one of the reflecting elements is partitioned into a plurality of regions and at least one of the regions corresponds to a single color, and the plurality of regions corresponds to a mix of two or more colors.

18. The method of claim 10, wherein light reflected from at least one of the reflecting elements comprises a mix of two or more colors.

19. An image compensation method, comprising:
    disposing a plurality of light sources and corresponding reflecting elements on a carrier such that when one of the light sources is powered to provide light, a corresponding one of the reflecting elements reflects a beam of light biased towards a particular color content; and
    positioning the plurality of reflecting elements so that one of the reflecting elements is in a position to reflect light provided by the light source and provide the reflected beam of light to a scanning location.

20. The method of claim 19, wherein the reflected beam of light is biased towards the color red.

21. The method of claim 19, wherein the beam of light is reflected within a scanner.

22. The method of claim 19, wherein the reflected beam of light is biased towards the color green.

23. The method of claim 19, wherein the light source comprises a daylight lamp.

24. An apparatus, comprising:
means for disposing a light source on a carrier;
means for positioning a reflecting element on the carrier, wherein the reflecting element is adapted to reflect at least a portion of light transmitted by the light source in a beam of light and to bias the beam of light towards a color, the reflected light having a color bias different from the light source, wherein the reflecting element is positioned to direct the beam of light to a scanning location, wherein the light source and the scanning location form a substantially straight line configuration, and the light source is positioned between the reflecting element and the scanning location; and
wherein the reflecting element includes a reflecting region, the reflecting region having a width at both ends that is greater than a width in a middle of the reflecting region.

25. The apparatus of claim 24, wherein the reflecting element includes multiple sections.

26. The apparatus of claim 24, wherein the reflecting element is partitioned into a plurality of regions and at least one of the regions corresponds to a single color, and the plurality of regions corresponds to a mix of two or more colors.

27. The apparatus of claim 24, wherein the reflecting element corresponds to a single color.

28. The apparatus of claim 24 wherein the apparatus is a scanner.

29. A carrier, comprising:
a groove having an interior surface; and
a reflecting element disposed on the carrier and coupled to the interior surface of the groove, the reflecting element having a reflecting region, the reflecting region having a width near ends of the reflecting region that is greater than a width in a middle of the reflecting region, wherein the reflecting element is configured to reflect light having a first color content in a beam of light wherein the beam of light has a second color content different than the first color content, wherein the reflecting element is arranged to direct the reflected beam of light to an image to be scanned.

30. The carrier of claim 29 wherein the carrier is configured to be integrated into an imaging device.

31. The carrier of claim 29 further comprising:
another groove having an interior surface; and
another reflecting element disposed on the carrier and coupled to the interior surface of the another groove.

32. The carrier of claim 29 wherein the carrier is configured to be movably attached to an interior of an imaging device such that the carrier is rotatable within the imaging device.

33. The carrier of claim 29 further comprising protrusions positioned at an upper region of grove, the protrusions to removeably secure a light generating component.

34. The carrier of claim 29 wherein the reflective element comprises sputtered material.

35. The carrier of claim 29 wherein the reflective element comprises reflective tape.

36. An image compensation structure for a scanner, the image compensation structure comprising:
a light source disposed in the scanner and adapted to produce light having a first color content; and
a color compensating reflective element disposed in the scanner and adapted to reflect at least a portion of light produced by the light source toward a scanning location, wherein the color compensating reflective element includes:
a supporting frame; and
a reflecting element disposed on the supporting frame, the reflecting element having a reflecting region with a width at both ends that is greater than a width in a middle of the reflecting region, wherein the reflecting element is adapted to reflect light from the light source to produce a beam of light having a second color content different than the first color content.

37. The structure of claim 36, wherein the beam of light is biased, relative to light produced by the light source, towards the color red.

38. The structure of claim 36, wherein the beam of light is biased, relative to light produced by the light source, towards the color blue.

39. The structure of claim 36, wherein the beam of light is biased, relative to light produced by the light source, towards the color green.

40. The structure of claim 36, wherein the light source comprises a daylight lamp.

41. The structure of claim 36, wherein the reflecting element includes multiple sections.

42. The structure of claim 36, wherein the reflecting element is partitioned into a plurality of regions and at least one of the regions corresponds to a single color, and the plurality of regions corresponds to a mix of two or more colors.

43. The structure of claim 36, wherein the reflecting element corresponds to a single color.

44. An image compensation method, comprising:
obtaining a response graph associated with a color content among three primary colors of light provided by a target light source by employing an optical sensor chip;
obtaining voltage values associated with the three primary colors for a given region of the optical sensor chip;
determining color content of a compensating light beam by employing the obtained response graph;
employing the obtained voltage values of the three primary colors to produce a suitable strength for the compensating light beam; and
positioning a reflecting element proximate to a light source having a first color content so that the reflecting element is operable to reflect light from the light source to produce a reflected beam of light having a second color content and a magnitude in accordance with the compensating light beam, the reflecting element including a reflecting region having a width at both ends that is greater than a width in a middle of the reflecting region, wherein the reflecting element is positioned to direct the reflected beam of light to a scanning location.

45. The method of claim 44, wherein the second color content is biased towards the color red relative to the first color content.

46. The method of claim 44, wherein the second color content is biased towards the color blue relative to the first color content.

47. The method of claim 44, wherein the second color content is biased towards the color green relative to the first color content.

48. The method of claim 44, wherein the light source comprises a daylight lamp.

49. The method of claim 44, wherein the reflecting element includes multiple sections.

50. The method of claim 44, wherein the reflecting element is divided into a plurality of regions and at least one of the regions corresponds to a single color, and at least one of the regions corresponds to a mix of two or more colors.

51. The method of claim 44, wherein the reflecting element corresponds to a single color.

52. The method of claim 44, wherein the light source and the reflecting element are positioned to direct light from the light source and reflected light from the reflecting element to a scanning location, wherein the light source, the reflecting element and the scanning location are positioned to form a substantially triangular configuration.

53. An image compensation method, comprising:
- obtaining a response graph of the color content of three primary colors of light provided by a target light source by employing an optical sensor chip;
- obtaining voltage values associated with the three primary colors for a given region of the optical sensor chip;
- determining color content of a compensating light beam by employing the obtained response graph;
- employing the obtained voltage values of the three primary colors to identify a compensating beam having a suitable strength; and
- positioning a reflecting element proximate to the light source so that light reflected from the reflecting element light has a color content and a magnitude in accordance with the compensating beam;
- wherein the light source and the reflecting element are arranged to direct light from the light source and reflected light from one of the reflecting elements to a scanning location, wherein the reflecting elements, the light source and the scanning location form a substantially straight line configuration with the light source positioned between the reflecting elements and the scanning location.

* * * * *

UNITED STATES PATENT AND TRADEMARK OFFICE
CERTIFICATE OF CORRECTION

PATENT NO. : 7,446,913 B2  Page 1 of 1
APPLICATION NO. : 10/064704
DATED : November 4, 2008
INVENTOR(S) : Chen et al.

It is certified that error appears in the above-identified patent and that said Letters Patent is hereby corrected as shown below:

At column 13, line 52, please replace "region of grove" with --region of the groove--.

Signed and Sealed this

Eleventh Day of August, 2009

David J. Kappos
*Director of the United States Patent and Trademark Office*